United States Patent
Engelmann et al.

(10) Patent No.: US 7,169,838 B2
(45) Date of Patent: Jan. 30, 2007

(54) HALOGEN-FREE FLAMEPROOF POLYESTER

(75) Inventors: Jochen Engelmann, Neustadt (DE); Detlev Wartig, Schwetzingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 34 days.

(21) Appl. No.: 10/485,642

(22) PCT Filed: Jul. 26, 2002

(86) PCT No.: PCT/EP02/08317

§ 371 (c)(1), (2), (4) Date: Feb. 3, 2004

(87) PCT Pub. No.: WO03/014212

PCT Pub. Date: Feb. 20, 2003

(65) Prior Publication Data

US 2004/0192812 A1    Sep. 30, 2004

(30) Foreign Application Priority Data

Aug. 7, 2001 (DE) ............................. 101 37 930

(51) Int. Cl.
*C08K 5/5317* (2006.01)
*C08K 5/3492* (2006.01)

(52) U.S. Cl. ................. 524/126; 524/100; 524/101; 524/106; 524/133

(58) Field of Classification Search ........ 524/100–101, 524/106, 126, 133
See application file for complete search history.

(56) References Cited

U.S. PATENT DOCUMENTS

| 3,679,628 A | * | 7/1972 | Brinkmann et al. ........ 524/130 |
| 5,780,534 A | | 7/1998 | Kleiner et al. |
| 6,211,402 B1 | * | 4/2001 | Kleiner .......................... 562/8 |
| 6,255,371 B1 | | 7/2001 | Schlosser et al. |
| 6,433,045 B1 | * | 8/2002 | Hanabusa et al. .......... 524/100 |
| 6,474,887 B2 | * | 11/2002 | Ozu ............................. 401/23 |
| 6,503,969 B1 | * | 1/2003 | Klatt et al. ................. 524/133 |

FOREIGN PATENT DOCUMENTS

| DE | 198 20398 | | 11/1999 |
| DE | 199 04814 | | 8/2000 |
| EP | 919 591 | | 6/1999 |
| EP | 932 643 | | 8/1999 |
| JP | 04-76061 | * | 3/1992 |
| RU | 2190649 | * | 10/2002 |

* cited by examiner

*Primary Examiner*—Peter Szekely
(74) *Attorney, Agent, or Firm*—Novak Druce DeLuca & Quigg, LLP

(57) ABSTRACT

The invention relates to thermoplastic moulding materials containing A) between 20 and 97 wt. % of a thermoplastic polyester; B) between 1 and 40 wt. % of a phosphinic acid salt and/or a diphosphinic acid salt and/or the polymers thereof, constituent B) having an average particle size (value $d_{50}$) which is smaller than 10 μm; C) between 1 and 30 wt. % of a nitrogenated flameproofing agent; D) between 0 and 5 wt. % of at least one ester or amide of saturated or unsaturated aliphatic carboxylic acids having between 10 and 40 C atoms and aliphatic saturated alcohols or amines having between 2 and 40 C atoms; and E) between 0 and 60 wt. % of other additives. The total weight percent of constituents A) to E) amounts to 100%.

18 Claims, No Drawings

HALOGEN-FREE FLAMEPROOF POLYESTER

The invention relates to thermoplastic molding compositions comprising
A) from 20 to 97% by weight of a thermoplastic polyester,
B) from 1 to 40% by weight of a phosphinic salt and/or of a diphosphinic salt and/or polymers of these, where the median particle size ($d_{50}$) of component B) is less than 10 µm,
C) from 1 to 30% by weight of a nitrogen-containing flame retardant,
D) from 0 to 5% by weight of at least one ester or amide of aliphatic saturated or unsaturated carboxylic acids having from 10 to 40 carbon atoms with saturated aliphatic alcohols or amines having from 2 to 40 carbon atoms, and
E) from 0 to 60% by weight of other additives, where the total of the percentages by weight of components A) to E) is 100%.

The invention further relates to the preparation and the use of the molding compositions of the invention, for producing fibers, films or moldings of any type.

Polyester molding compositions rendered flame-retardant using a P-containing flame retardant in combination with a melamine derivative are known.

EP-A 932 643 discloses by way of example the combination of calcium phosphinates with melamine cyanurate as flame retardant for polyesters.

Most phosphinates have good solubility in water, and therefore when the polyester molding compositions are stored in damp conditions a white deposit forms on the molding, and in the case of contact with metals (Cu, brass, Zn) clear evidence of corrosion becomes apparent.

It is an object of the present invention, therefore, to provide halogen-free flame-retardant polyester molding compositions which under a very wide variety of storage conditions for either pellets or moldings (storage in hot or damp conditions, etc.), show no discoloration and no, or only extremely slight, migration of additives.

A further intention is to reduce to an absolute minimum the corrosion on metal surfaces which are in direct contact with the polymer matrix under the various conditions of temperature and humidity.

It is also desirable to obtain a balanced property profile in relation to flame retardancy (UL 94 V-0 to 1.6 mm) mechanical, thermal, and electrical properties, and also with respect to processability.

We have found that this object is achieved by means of the molding compositions defined at the outset. Preferred embodiments are given in the subclaims.

Depending on the preparation conditions during the precipitation process, the particle sizes in which conventional commercial phosphinate is produced are $d_{50}$=25 to 150 µm. To achieve the object described above, the phosphinate was finely ground ($d_{50}$=from 2 to 10 µm). Surprisingly, it was found that use of the fine-particle phosphinate gave a marked reduction in migration and in contact corrosion on metals. At the same time, some other physical properties were slightly improved (mechanical properties), but in no case was there an adverse effect on physical properties.

However, the disadvantage of fine-particle phosphinate during processing is that it tends to clump and to cake on the walls of vessels. This causes a considerable increase in resources required for the handling of this powder, e.g. during metering of the powder into the polymer melt.

A further object of the present invention was therefore to find an improved process for preparing the molding compositions of the invention, permitting, inter alia, simple processing of the separate components, in particular of the phosphinic salt.

We have found that this object is achieved by processes for preparing the molding compositions of the invention which comprise mixing the comminuted component B) with C) in advance, or mixing B) and C) in advance and comminuting these together, and then mixing them with the other components A, and also, where appropriate D and/or E, homogenizing the same in the melt, and discharging, cooling, and pelletizing the same. Surprisingly, the resultant mixture has markedly improved free-flowing properties (no clumping). It is preferable here that the two flame retardants, both of which are intended to be present with about the same particle size in the composition, are mixed prior to grinding. The two substances are then moreover present in a homogeneous mixture, giving very uniform distribution of the additives in the composition and thus improved properties.

As component (A) the molding compositions of the invention comprise from 20 to 98% [sic] by weight, preferably from 30 to 97% by weight, and in particular from 30 to 89% by weight, of a thermoplastic polyester.

Use is generally made of polyesters A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$–$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 (measured in 0.5% strength by weight solution in a phenol/o-dichlorobenzene mixture in a weight ratio of 1:1 at 25° C.) in accordance-with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use recycled PET materials (also termed scrap PET) in a mixture with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are isolated and purified and then melted and pelletized using an extruder. This usually facilitates handling and free flow, and metering for further steps in processing.

The recycled materials used may either be pelletized or in the form of regrind. The edge length should not be more than 6 mm, preferably less than 5 mm.

Because polyesters undergo hydrolytic cleavage during processing (due to traces of moisture) it is advisable to predry the recycled material. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

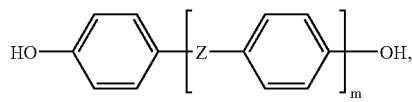

where Z is alkylene or cycloalkylene having up to 8 carbon atoms, arylene having up to 12 carbon atoms, carbonyl, sulfonyl, oxygen or sulfur, or a chemical bond, and m is from 0 to 2. The phenylene groups of the compounds may also have substitution by $C_1$–$C_6$-alkyl or alkoxy and fluorine, chlorine or bromine.

Examples of parent compounds for these compounds are dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene, resorcinol, and
hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane, and in particular to
2,2-di(4'-hydroxyphenyl)propane
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrele® (DuPont).

According to the invention, polyesters include halogen-free polycarbonates. Examples of suitable halogen-free polycarbonates are those based on diphenols of the formula

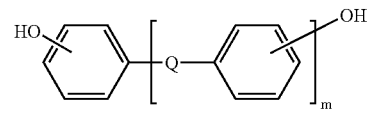

where Q is a single bond, $C_1$–$C_8$-alkylene, $C_2$–$C_3$-alkylidene, $C_3$–$C_6$-cycloalkylidene, $C_6$–$C_{12}$-arylene, or —O—, —S— or —SO$_2$—, and m is an integer from 0 to 2.

The phenylene radicals of the diphenols may also have substituents, such as $C_1$–$C_6$-alkyl or $C_1$–$C_6$-alkoxy.

Examples of preferred diphenols of this formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically by incorporating 0.05 to 2.0 mol %, based on the total of the biphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to an average molar mass $M_w$ (weight-average) of from 10 000 to 200 000 g/mol, preferably from 20 000 to 80 000 g/mol.

The diphenols of this formula are known per se or can be prepared by known processes.

The polycarbonates may, for example, be prepared by reacting the diphenols with phosgene in the interfacial process, or with phosgene in the homogeneous-phase process (known as the pyridine process), and in each case the desired molecular weight may be achieved in a known manner by using an appropriate amount of known chain terminators. (In relation to polydiorganosiloxane-containing polycarbonates see, for example, DE-A 33 34 782).

Examples of suitable chain terminators are phenol, p-tert-butylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A 35 06 472, such as p-nonylphenyl, 3,5-di-tert-butylphenol, p-tert-octylphenol, p-dodecylphenol, 2-(3,5-dimethylheptyl) phenol and 4-(3,5-dimethylheptyl)phenol.

For the purposes of the present invention, halogen-free polycarbonates are polycarbonates made from halogen-free biphenols, from halogen-free chain terminators and, if used, halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the preparation process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

As component B), the molding compositions of the invention comprise from 1 to 40% by weight, preferably 1 to 30% by weight, and in particular from 5 to 20% by weight, of a phosphinic salt and/or of a diphosphinic salt, and/or polymers of these, where the median particle size ($d_{50}$) of component B) is less than 10 μm, preferably less than 7 μm. Preferred components B) are phosphinic salts of the formula I and/or diphosphinic salts of the formula II, and/or polymers of these

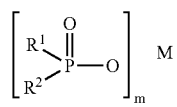

-continued

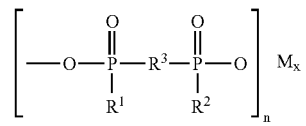

where:
$R^1$ and $R^2$ are hydrogen, $C_1$–$C_6$-alkyl, which may, where appropriate, contain a hydroxyl group, preferably $C_1$–$C_4$-alkyl, linear or branched, e.g. methyl, ethyl, n-propyl, isopropyl, n-butyl, tert-butyl, n-pentyl; phenyl; where preferably at least one radical $R^1$ or $R^2$ is hydrogen and in particular $R^1$ and $R^2$ are hydrogen;
$R^3$ is $C_1$–$C_{10}$-alkylene, linear or branched, e.g. methylene, ethylene, n-propylene, iso-propylene, n-butylene, tert-butylene, n-pentylene, n-octylene, n-dodecylene; arylene, e.g. phenylene, naphthylene; alkylarylene, e.g. methylphenylene, ethylphenylene, tert-butylphenylene, methylnaphthylene, ethylnaphthylene, tert-butyl-naphthylene; arylalkylene, e.g. phenylmethylene, phenylethylene, phenylpropylene, phenylbutylene;
M is an alkaline-earth metal or alkali metal, Al, Zn, Fe or boron;
m is an integer from 1 to 3;
n is an integer from 1 to 3, and
x is 1 or 2.

Particular preference is given to compounds of the formula I in which $R^1$ and $R^2$ are hydrogen, where M is preferably Ca, Zn or Al, and very particular preference is given to calcium phosphinate.

Products of this type are available commercially, e.g. in the form of calcium phosphinate.

Examples of suitable salts of formula I or II in which only one radical $R^1$ or $R^2$ is hydrogen are salts of phenylphosphinic acid, where preference is given to its Na and/or Ca salts.

Other preferred salts have a hydroxyl-containing alkyl radical $R^1$ and/or $R^2$. These are obtainable by hydroxymethylation, for example. Preferred compounds are Ca, Zn and Al salts.

The median particle size ($d_{50}$) of component B) is less than 10 μm, preferably less than 7 μm, and in particular less than 5 μm.

The $d_{50}$ is generally understood by the skilled worker to be that particle size which is greater than the particle size of 50% of the particles and less than the particle size of 50% of the particles.

The $d_{10}$ is preferably less than 4 μm, in particular 3 μm, and very particularly preferably less than 2 μm.

Preferred $d_{90}$ values are less than 40 μm, and in particular less than 30 μm, and very particularly preferably less than 20 μm.

The particle sizes are generally determined by laser diffraction with injector pressures greater than 2 bar, preferably greater than 2.5 bar, and with a gas velocity greater than 100 m/s, preferably greater than 140 m/s.

The novel thermoplastic molding compositions may comprise, as component C), from 1 to 30% by weight, preferably from 1 to 20% by weight and in particular from 5 to 15% by weight, of a nitrogen-containing flame retardant.

Melamine cyanurate, which is suitable and particularly preferred (component C) according to the invention is a reaction product made from preferably equimolar amounts of melamine (formula III) and cyanuric acid and/or isocyanuric acid (formulae IIIa and IIIb)

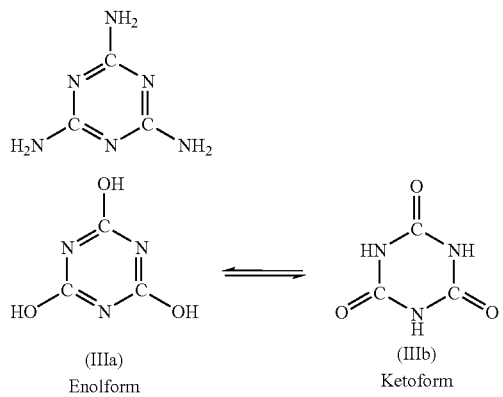

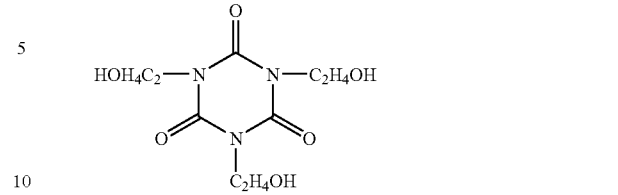

It is obtained, for example, by reacting aqueous solutions of the starting compounds at from 90 to 100° C. The product available commercially is a white powder with an average particle size $d_{50}$ of from 1.5–7 μm.

All types of melamine compounds are particularly preferred. Suitable compounds (also termed salts or adducts) are melamine borate, oxalate, phosphate (prim.), phosphate (sec.) and pyrophosphate (sec.), melamine neopentyl glycol borate, and also polymeric melamine phosphate (CAS No. 56386-64-2).

| Suitable guanidine salts are | |
|---|---|
| | CAS No. |
| G carbonate | 593-85-1 |
| G cyanurate (prim.) | 70285-19-7 |
| G phosphate (prim.) | 5423-22-3 |
| G phosphate (sec.) | 5423-23-4 |
| G sulfate (prim.) | 646-34-4 |
| G sulfate (sec.) | 594-14-9 |
| Guanidine pentaerythritol borate | N.A. |
| Guanidine neopentyl glycol borate | N.A. |
| Urea phosphate (green) | 4861-19-2 |
| Urea cyanurate | 57517-11-0 |
| Ammeline | 645-92-1 |
| Ammelide | 645-93-2 |
| Melam | 3576-88-3 |
| Melem | 1502-47-2 |
| Melon | 32518-77-7 |

For the purposes of the present invention, the compounds include, for example, benzoguanamine itself and its adducts and salts, and also the nitrogen-substituted derivatives and their adducts and salts.

Another suitable compound is ammonium polyphosphate $(NH_4PO_3)_n$ where n is from about 200 to 1000, preferably from 600 to 800, and tris(hydroxyethyl) isocyanurate (THEIC) of the formula IV or its reaction products with aromatic carboxylic acids $Ar(COOH)_m$, which may be present in mixtures with one another, where Ar is a mono-, bi- or trinuclear aromatic six-membered ring system and m is 2, 3 or 4.

Examples of suitable carboxylic acids are phthalic acid, isophthalic acid, terephthalic acid, 1,3,5-benzenetricarboxylic acid, 1,2,4-benzenetricarboxylic acid, pyromellitic acid, mellophanic acid, prehnitic acid, 1-naphthoic acid, 2-naphthoic acid, naphthalene dicarboxylic acids, and anthracenecarboxylic acids.

They are prepared by reacting the tris(hydroxyethyl) isocyanurate with the acids, or with their alkyl esters or halides in accordance with the processes of EP-A 584 567.

Reaction products of this type are a mixture of monomeric and oligomeric esters which may also have been crosslinked. The degree of oligomerization is usually from 2 to about 100, preferably from 2 to 20. Preference is given to the use of THEIC and/or its reaction products in mixtures with phosphorus-containing nitrogen compounds, in particular $(NH_4PO_3)_n$ or melamine pyrophosphate or polymeric melamine phosphate. The mixing ratio, for example of $(NH_4PO_3)_n$ to THEIC is preferably 90-50:10-50% by weight, in particular 80-50:50-20% by weight, based on the mixture of components B) of this type.

Other suitable compounds are benzoguanamine compounds of the formula V:

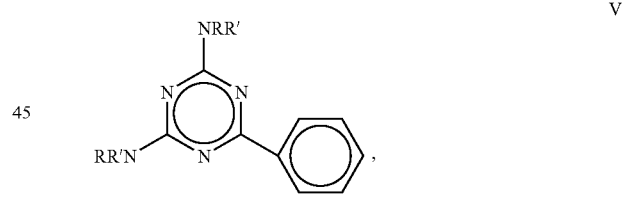

where R and R' are straight-chain or branched alkyl radicals having from 1 to 10 carbon atoms, or preferably hydrogen, and in particular adducts of these with phosphoric acid, boric acid, and/or pyrophosphoric acid.

Preference is also given to allantoin compounds of the formula VI

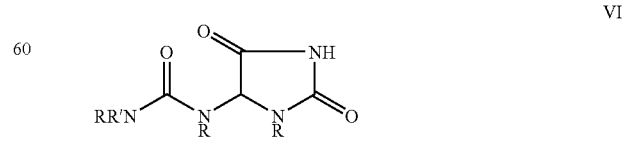

where R and R' are as defined in formula V, and also the salts of these with phosphoric acid, boric acid and/or pyrophosphoric acid, and also glycolurils of the formula VII or salts of these with the abovementioned acids

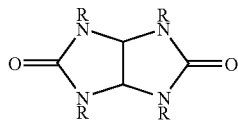

where R is as defined in formula V.

Suitable products are obtainable commercially or in accordance ith DE-A 196 14 424.

The cyanoguanidine (formula VIII) which can be used according to the invention is obtained, for example, by reacting calcium cyanamide with carbonic acid, whereupon the cyanamide produced dimerizes at a pH of from 9 to 10 to give cyanoguanidine.

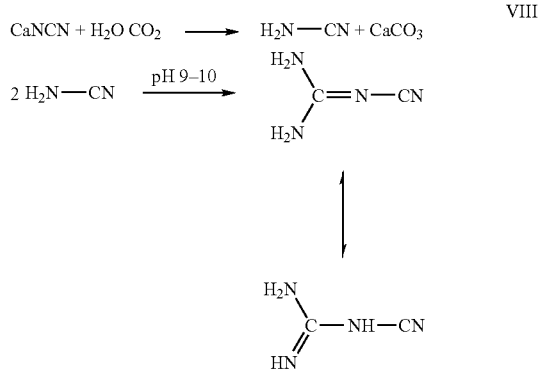

The product which can be obtained commercially is a white powder with a melting point of from 209 to 211° C.

The novel molding compositions comprise, as component D), from 0 to 5% by weight, preferably from 0.05 to 3% by weight and in particular from 0.1 to 2% by weight, of at least one ester or amide of saturated or unsaturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms.

The carboxylic acids may be mono- or dibasic. Examples which may be mentioned are pelargonic acid, palmitic acid, lauric acid, margaric acid, dodecanedioic acid, behenic acid and, particularly preferably, stearic acid, capric acid and montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol and pentaerythritol. Glycerol and pentaerythritol are preferred.

The aliphatic amines may be mono- to tribasic. Examples of these are stearylamine, ethylenediamine, propylenediamine, hexamethylenediamine and di(6-aminohexyl)amine. Ethylenediamine and hexamethylenediamine are particularly preferred.

Correspondingly, preferred esters or amides are glycerol distearate, glycerol tristearate, ethylenediamine distearate, glycerol monopalmitate, glycerol trilaurate, glycerol monobehenate and pentaerythritol tetrastearate.

It is also possible to use mixtures of different esters or amides or combinations of esters with amides. The mixing ratio may be as desired.

The novel molding compositions may comprise, as component E), from 0 to 60% by weight, in particular up to 50% by weight, of other additives and processing aids which are different from B), C) and D).

Examples of usual additives E) are amounts of up to 40% by eight, preferably up to 30% by weight, of elastomeric polymers (also frequently termed impact modifiers, elastomers or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type have been described, for example in Houben-Weyl, Methoden der organischen Chemie, Vol. 14/1 (Georg-Thieme-Verlag, Stuttgart, Germany, 1961), pages 392–406, and in the monograph by C. B. Bucknall, "Toughened Plastics"(Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenyl-norbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These monomers containing dicarboxylic acid derivatives or containing epoxy groups are preferably incorporated into the rubber by adding to the monomer mixture monomers containing dicarboxylic acid groups and/or epoxy groups and having the formula I, II, III or IV

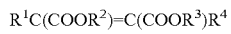 (I)

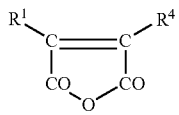 (II)

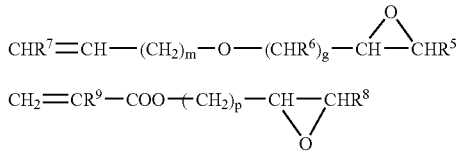

(III)
(IV)

where $R^1$ to $R^9$ are hydrogen or alkyl having from 1 to 6 carbon atoms, and m is an integer from 0 to 20, g is an integer from 0 to 10 and p an integer from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate. Although the latter have no free carboxyl groups their behavior approximates to that of the free acids and they are therefore termed monomers with latent carboxyl groups.

The copolymers are advantageously composed of from 50 to 98% by weight of ethylene, from 0.1 to 20% by weight of monomers containing epoxy groups and/or methacrylic acid and/or monomers containing anhydride groups, the remaining amount being (meth)acrylates.

Particular preference is given to copolymers made from from 50 to 98% by weight, in particular from 55 to 95% by weight of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by Blackley in the monograph "Emulsion Polymerization". The emulsifiers and catalysts which may be used are known per se.

In principle it is possible to use homogeneously structured elastomers or those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, a-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxyl, latent carboxyl, amino and amide groups, and also functional groups which may be introduced by concomitant use of monomers of the formula

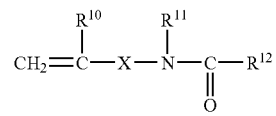

where:
$R^{10}$ is hydrogen or $C_1$–$C_4$-alkyl,
$R^{11}$ is hydrogen or $C_1$–$C_8$-alkyl or aryl, in particular phenyl,
$R^{12}$ is hydrogen, $C_1$–$C_{10}$-alkyl, $C_6$–$C_{12}$-aryl or —$OR^{13}$.
$R^{13}$ is $C_1$–$C_8$-alkyl or $C_6$–$C_{12}$-aryl, if desired with substitution by O- or N-containing groups,
X is a chemical bond or $C_1$–$C_{10}$-alkylene or $C_6$–$C_{12}$-arylene, or

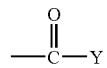

Y is O—Z or NH—Z, and
Z is $C_1$–$C_{10}$-alkylene or $C_6$–$C_{12}$-arylene.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention is made firstly of graft polymers with a core and at least one outer shell and the following structure:

| Type | Monomers for the core | Monomers for the envelope |
|------|----------------------|---------------------------|
| I | 1,3-butadiene, isoprene, n-butyl acrylate, ethyl-hexyl acrylate or mixtures of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers with reactive groups as described below |
| V | styrene, acrylonitrile, methyl methacrylate or mixtures of these | first envelope made of monomers as described in I and II for the core second envelope as described in I or IV for the envelope |

These graft polymers, in particular amounts of up to 40% by weight of ABS and/or ASA polymers, are used in particular for the impact-modification of PBT, if desired mixed with up to 40% by weight of polyethylene terephthalate. Corresponding blend products are commercially available under the trade name Ultradur®S (previously Ultrablend®S (BASF AG)).

Instead of graft polymers whose structure has more than one shell it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubbers listed above.

Fibrous or particulate fillers E) which may be mentioned are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular up to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

The fibrous fillers may have been surface-precoated with a silane compound to improve compatibility with the thermoplastic.

Suitable silane compounds have the formula:

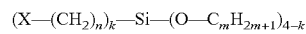

where:
X is $NH_2$—,

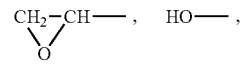

n is an integer from 2 to 10, preferably 3 to 4,
m is an integer from 1 to 5, preferably 1 to 2, and
k is an integer from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which contain a glycidyl group as substituent X.

The amounts of the silane compounds generally used for surface-coating from 0.05 to 5% by weight, preferably from 0.5 to 1.5% by weight and in particular from 0.8 to 1% by weight (based on E).

Acicular mineral fillers are also suitable.

For the purposes of the present invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if desired, have been pretreated with the abovementioned silane compounds, but the pretreatment is not essential.

Other fillers which may be mentioned are kaolin, calcined kaolin, wollastonite, talc and chalk.

The novel thermoplastic molding compositions may comprise, as component E), conventional processing aids, such as stabilizers, oxidation inhibitors, agents to prevent decomposition by heat or by ultraviolet light, lubricants, mold-release agents, colorants, such as dyes and pigments, nucleating agents, plasticizers, etc.

Examples of oxidation inhibitors and heat stabilizers are sterically hindered phenols and/or phosphites, hydroquinones, aromatic secondary amines, such as diphenylamines, various substituted representatives of these groups and mixtures of these in concentrations of up to 1% by weight, based on the weight of the thermoplastic molding compositions.

UV stabilizers which may be mentioned and are usually used in amounts of up to 2% by weight, based on the molding composition, are various substituted resorcinols, salicylates, benzotriazoles and benzophenones.

Colorants which may be added are inorganic pigments, such as titanium dioxide, ultramarine blue, iron oxide and carbon black, and also organic pigments, such as phthalocyanines, quinacridones and perylenes, and also dyes, such as nigrosine and anthraquinones.

Nucleating agents which may be used are sodium phenyl phosphinate, alumina, silica, and preferably talc.

Other lubricants and mold-release agents which differ from E) and are usually used in amounts of up to 1% by weight are preferably long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), calcium montanate, sodium montanate, and also low-molecular-weight polyethylene waxes and low-molecular-weight polypropylene waxes.

Examples of plasticizers which may be mentioned are dioctyl phthalates, dibenzyl phthalates, butyl benzyl phthalates, hydrocarbon oils and N-(n-butyl)benzenesulfonamide.

The novel molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "vinyl and Related Polymers", Wiley-Verlag, 1952, pages 484–494 and by Wall in "Fluoropolymers"(Wiley Interscience, 1972).

These fluorine-containing ethylene polymers have homogeneous distribution in the molding compositions and preferably have a particle size $d_{50}$ (number average) in the range from 0.05 to 10 µm, in particular from 0.1 to 5 µm. These small particle sizes may particularly preferably be achieved by the use of aqueous dispersions of fluorine-containing ethylene polymers and the incorporation of these into a polyester melt.

The novel thermoplastic molding compositions may be prepared by methods known per se, by mixing the starting components in conventional mixing apparatuses, such as screw extruders, Brabender mixers or Banbury mixers, and then extruding them. The extrudate may be cooled and comminuted. It is also possible to premix individual components and then to add the remaining starting materials individually and/or likewise in a mixture. The mixing temperatures are generally from 230 to 290° C.

In one preferred method of operation, components B) and C) may be mixed in advance, generally at from 20 to 60° C., preferably at room temperature, and then mixed with component A), and also, where appropriate, D and/or E, homogenized in the melt, discharged, cooled, and pelletized.

It is also possible here, where appropriate, for component C) to be comminuted separately and prior to the mixing. The particle sizes are preferably the $d_{50}$, and where appropriate also the $d_{10}$ and/or $d_{90}$, of component B).

In another particular embodiment, components B) and C) are mixed in advance and comminuted together and are then mixed as described above with the other components.

In another preferred method of operation, components B) and C) and also, where appropriate, D), and conventional additives E), may be mixed with a polyester prepolymer, compounded, and pelletized. The resultant pellets are then condensed continuously or batchwise in the solid phase under an inert gas at a temperature below the melting point of component A) until the desired viscosity has been achieved.

The thermoplastic molding compositions of the invention have low susceptibility to migration and good flame retardancy.

In addition, metal corrosion has been minimized and mechanical properties are retained.

In particular, the processing of the separated components (without clumping or caking) has been simplified.

The molding compositions are suitable for producing fibers, films and moldings, in particular for applications in the electrical and electronics sectors. Particular applications are lamp parts, such as lamp sockets and lamp holders, plugs and multipoint connectors, coil formers, casings for capacitors or contactors, and circuit-breakers, relay housings and reflectors.

EXAMPLES

Component A: Polybutylene terephthalate with a viscosity number of 130 ml/g and a carboxyl end group content of 34 mval/kg (Ultradur® B 4520 from BASF AG) (VN measured in a 0.5% strength by weight solution in a 1:1 mixture of phenol and ortho-dichlorobenzene comprising 0.7% by weight of pentaerythritol tetrastearate (component D), based on 100% by weight of A), at 25° C.).

Component B: $Ca(H_2PO_2)_2$

Component C: melamine cyanurate

Component E: chopped glass fibers with average thickness 10 µm

Preparation of Molding Compositions

The Ca phosphinate was ground and the particle size determined by laser diffraction using a Malvern 2600 (inlet pressure 3.5 bar; gas velocity 172 m/s). Mixing with melamine cyanurate for example 6 took place after grinding, in a mixer. For example 7, the melamine cyanurate C) and the Ca phosphinate B) were mixed in the unground state ($d_{50}$>100 µm) and then ground together to a particle size $d_{50}$ =4 µm.

Components A) to E) were always blended in a twin-screw extruder at from 250 to 260° C. and extruded into a water bath. After pelletization and drying, test specimens were injection molded.

The fire tests were carried out after the usual conditioning to UL-94 specification, the mechanical property tests to ISO 527-2 and, respectively, ISO 179/leU. The CTI measurements were made to IEC 112 using test solution A.

Migration was determined over 20 days through storage at 100% rel. humidity (12 h at 23° C., 12 h at 40° C.). 64 g of injection moldings (fire specimens of thickness 3.2 mm) were used. The phosphinate emitted was washed off into 50 ml of water, using moisture condensed on the surface of the molding. The P concentration in the water is analyzed by atomic emission spectroscopy. Contact corrosion was studied under identical storage conditions, half of each of the metal plates made from Cu, Zn, and brass (40*40*1 mm³) being immersed in the pellets and the other half therefore being exposed in the gas space above the pellets.

The makeup of the molding compositions was 50% by weight of polybutylene terephthalate, 15% by weight of Ca phosphinate of the particle size stated in each case, 10% by weight of melamine cyanurate ($d_{50}$=3 µm), and 25% by weight of chopped glass fiber of average thickness 10 µm.

The procedures of the invention and the results of the measurements are found in the table.

TABLE

| | Test specification | Unit | Examples | | | | | | |
|---|---|---|---|---|---|---|---|---|---|
| | | | 1 | 2 | 3 | 4 | 5* | 6 | 7 |
| Addition of MC/ calcium phosphinate | | | separate | separate | separate | separate | separate | Mixed after grinding | Mixed prior to grinding |
| Calcium phosphinate B) particle sizes | | | | | | | | | |
| $d_{10}$ | | μm | 2 | 2 | 2 | 3 | 6 | 2.5 | 1 |
| $d_{50}$ | | μm | 2.1 | 4 | 6 | 9 | 25 | 4 | 4 |
| $d_{90}$ | | μm | 2.3 | 8 | 12 | 27 | 100 | 9 | 7 |
| Tensile modulus of elasticity | ISO 527-2 | MPa | 11400 | 11300 | 11500 | 11600 | 11800 | 11600 | 11600 |
| Yield stress, tensile stress at break | ISO 527-2 | MPa | 109 | 111 | 109 | 110 | 106 | 110 | 113 |
| Charpy impact strength 23° C. | ISO 179/leU | kJ/m² | 41 | 44 | 40 | 41 | 39 | 43 | 45 |
| Test to UL-94 standard at d = 1.6 mm | UL 94 | Class | V-0 | V0 | V0 | V0 | V0 | V0 | V0 |
| Cracking CTI, test solution A | IEC 112 | c | 600 | 600 | 600 | 600 | 600 | 600 | 600 |
| Migration | | mg/l | 15 | 15 | 41 | 47 | 110 | 17 | 13 |
| Contact corrosion on Cu, Zn, and brass | | | ++ | ++ | + | 0 | − | ++ | ++ |

++ very slight contact corrosion
+ slight contact corrosion
0 moderate contact corrosion
− marked contact corrosion
−− very marked contact corrosion

What is claimed is:

1. A thermoplastic molding composition comprising
A) from 20 to 97% by weight of a thermoplastic polyester,
B) from 1 to 40% by weight of a phosphinic salt and/or of a diphosphinic salt and/or polymers of these, where the median particle size ($d_{50}$) of component B) is less than 10 μm, and wherein the particle size is determined by laser diffraction,
C) from 1 to 30% by weight of an organic nitrogen-containing flame retardant,
D) from 0 to 5% by weight of at least one ester or amide of aliphatic saturated or unsaturated carboxylic acids having from 10 to 40 carbon atoms with saturated aliphatic alcohols or amines having from 2 to 40 carbon atoms, and
E) from 0 to 60% by weight of other additives,
where the total of the percentages by weight of components A) to E) is 100%.

2. A thermoplastic molding composition as claimed in claim 1, comprising a phosphinic salt of formula I and/or a diphosphinic salt of formula II and/or polymers thereof

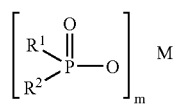
(I)

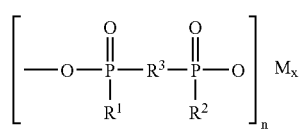
(II)

where:
$R^1$, $R^2$ are linear or branched $C_1$–$C_6$-alkyl, where appropriate containing a hydroxyl group, or are phenyl or hydrogen,
$R^3$ is linear or branched $C_1$–$C_{10}$-alkylene or is arylene, alkylarylene or arylalkylene,
M is an alkaline-earth metal or alkali metal, Zn, Al, Fe or boron,
m is an integer from 1 to 3,
n is an integer from 1 to 3, and,
x is 1 or 2.

3. A thermoplastic molding composition as claimed in claim 1, in which the median particle size $d_{50}$ of component B) is less than 7 μm.

4. A thermoplastic molding composition as claimed in claim 1, in which the $d_{10}$ of component B) is less than 4 μm.

5. A thermoplastic molding composition as claimed in claim 1, in which the $d_{90}$ of component B) is less than 40 μm.

6. A thermoplastic molding composition as claimed in claim 1, in which component C) is composed of melamine compounds.

7. A thermoplastic molding composition as claimed in claim 1, in which $R_1$ and $R^2$ are hydrogen and M is calcium or aluminum in the formulae I and II.

8. A process for preparing the thermoplastic molding compositions as claimed in claim 1, which comprises mixing components B) and C) in advance, and then with component A) and also, optionally, D) and/or E), homogenizing the same in the melt, and then discharging, cooling, and pelletizing the same.

9. The process for preparing the thermoplastic molding compositions as claimed in claim 8, which comprises mixing components B) and C) in advance and comminuting the same together, and then mixing the same with the other components.

10. A fiber, film or molding comprising the thermoplastic molding composition as claimed in claim 1.

11. A molding obtained from the thermoplastic molding composition prepared in accordance with the process conditions of claim 8.

12. A thermoplastic molding composition as claimed in claim 1, in which the $d_{10}$ of component B) is less than 4 μm and the $d_{90}$ of component B) is less than 40 μm.

13. A thennoplastic molding composition as claimed in claim 2, in which the $d_{10}$ of component B) is less than 4 μm and the $d_{90}$ of component B) is less than 40 μm.

14. A thermoplastic molding composition as claimed in claim 1, wherein comprising as component E) one or more additives selected from the group consisting of elastomeric polymers, fibrous fillers, particulate fillers, stabilizers, oxidation retarders, thermal decomposition stabilizers, UV stabilizers, lubricants, mold release agents, colorants, nucleating agents, plasticizers.

15. A thennoplastic molding composition as claimed in claim 1 wherein the laser diffraction is can-ied out wit injector pressures greater than 2 bar and a gas velocity greater than 100 m/s.

16. A thermoplastic molding composition as claimed in claim 3 wherein the $d_{10}$ of component B) is less than 3 μm.

17. A thermoplastic molding composition as claimed in claim 4 wherein the $d_{50}$ of component B) is less than 7 μm.

18. A thermoplastic molding composition as claimed in claim 1 wherein the $d_{50}$ of component B) is less than 5 μm and the $d_{10}$ of component B) is less than 3 μm.

* * * * *

UNITED STATES PATENT AND TRADEMARK OFFICE
CERTIFICATE OF CORRECTION

PATENT NO.         : 7,169,838 B2
APPLICATION NO. : 10/485642
DATED              : January 30, 2007
INVENTOR(S)       : Engelmann et al.

It is certified that error appears in the above-identified patent and that said Letters Patent is hereby corrected as shown below:

Column 18, indicated line 58, "$R_1$" should read --$R^1$--

Column 20, indicated line 6, "can-ied" should read --carried--

Signed and Sealed this

Tenth Day of July, 2007

JON W. DUDAS
*Director of the United States Patent and Trademark Office*